United States Patent
Das

(10) Patent No.: US 11,210,637 B2
(45) Date of Patent: Dec. 28, 2021

(54) SYSTEM AND METHOD FOR GENERATING SKILL-CENTRIC ONLINE RESUMES WITH VERIFIABLE SKILLS

(71) Applicant: STEM-Away, Inc., Los Gatos, CA (US)

(72) Inventor: Debaleena Das, Los Gatos, CA (US)

(73) Assignee: Stem-Away, Inc., Los Gatos, CA (US)

( * ) Notice: Subject to any disclaimer, the term of this patent is extended or adjusted under 35 U.S.C. 154(b) by 299 days.

(21) Appl. No.: 16/393,195

(22) Filed: Apr. 24, 2019

(65) Prior Publication Data

US 2019/0325398 A1 Oct. 24, 2019

Related U.S. Application Data

(60) Provisional application No. 62/661,708, filed on Apr. 24, 2018.

(51) Int. Cl.

| | |
|---|---|
| *G06Q 10/00* | (2012.01) |
| *G06Q 10/10* | (2012.01) |
| *G06F 16/22* | (2019.01) |
| *H04L 12/58* | (2006.01) |
| *G06Q 50/00* | (2012.01) |
| *G06F 16/9535* | (2019.01) |

(52) U.S. Cl.
CPC ......... *G06Q 10/1053* (2013.01); *G06F 16/22* (2019.01); *G06F 16/9535* (2019.01); *G06Q 50/01* (2013.01); *H04L 51/32* (2013.01)

(58) Field of Classification Search
CPC .... G06Q 10/1053; G06Q 50/01; G06F 16/22; G06F 16/9535; G06F 16/23; H04L 51/32
See application file for complete search history.

(56) References Cited

U.S. PATENT DOCUMENTS

| | | | | |
|---|---|---|---|---|
| 7,711,573 | B1 * | 5/2010 | Obeid | G06Q 10/1053 705/321 |
| 8,126,904 | B1 * | 2/2012 | Bettinger | G06Q 10/06 707/758 |
| 8,504,559 | B1 * | 8/2013 | Elman | G06Q 10/1053 707/722 |
| 9,244,985 | B1 * | 1/2016 | Haugen | G06F 21/62 |
| 9,331,973 | B1 * | 5/2016 | Kristinsson | G06F 16/35 |
| 10,198,512 | B2 * | 2/2019 | Makhani | G06F 16/24578 |
| 10,536,554 | B2 * | 1/2020 | Chatterjee | H04L 67/22 |
| 2013/0166465 | A1 * | 6/2013 | Barros | G06Q 10/1053 705/319 |
| 2014/0143228 | A1 * | 5/2014 | Blue | H04L 51/32 707/709 |

(Continued)

OTHER PUBLICATIONS

"Endorsement Deduction and Ranking in Social Networks" Hebert Perez-Roses, Francesc Sebe, Josep Maria Ribo. Aug. 20, 2018 (https://arxiv.org/pdf/1510.01997.pdf).*

*Primary Examiner* — Gabrielle A McCormick

(74) *Attorney, Agent, or Firm* — West & Associates, A PC; Stuart J. West; Theodore Marsh

(57) ABSTRACT

A system and method associated with online resume generation which can provide skill verification of assertions contained within a resume and associated systems and methods to display the information in a user-friendly and understandable manner. Some embodiments can comprise reviews associated with the verification process to provide a confidence level indicator associated with both the review and the asserted skill in the resume.

19 Claims, 16 Drawing Sheets

(56) References Cited

U.S. PATENT DOCUMENTS

| | | | | |
|---|---|---|---|---|
| 2014/0244532 A1* | 8/2014 | Budzienski | G06Q 10/1053 |
| | | | 705/321 |
| 2014/0258885 A1* | 9/2014 | Etchegoyen | H04L 65/403 |
| | | | 715/753 |
| 2015/0100538 A1* | 4/2015 | Chung | G06Q 10/101 |
| | | | 706/52 |
| 2015/0185827 A1* | 7/2015 | Sayed | G06F 3/013 |
| | | | 345/156 |
| 2015/0189026 A1* | 7/2015 | Cohen | H04W 4/21 |
| | | | 709/204 |
| 2016/0124958 A1* | 5/2016 | Sinha | G06F 16/9535 |
| | | | 707/733 |
| 2016/0321229 A1* | 11/2016 | Baird | G06F 40/169 |
| 2016/0378865 A1* | 12/2016 | Makhani | G06F 16/9535 |
| | | | 707/721 |
| 2017/0154313 A1* | 6/2017 | Duerr | G06F 16/248 |
| 2018/0007100 A1* | 1/2018 | Krasadakis | G06Q 10/1095 |
| 2018/0089607 A1* | 3/2018 | Iu | G06Q 30/0613 |
| 2018/0295207 A1* | 10/2018 | Mathur | G06F 16/437 |

\* cited by examiner

FIG. 15

SYSTEM AND METHOD FOR GENERATING SKILL-CENTRIC ONLINE RESUMES WITH VERIFIABLE SKILLS

CLAIM OF PRIORITY

This patent application claims the benefit of priority under 35 U.S.C. § 119(e) to U.S. Provisional Patent Application Ser. No. 62/661,708, filed Apr. 24, 2018, entitled, Method of Generating Skill Centric Online Resumes with Verifiable Skills, the complete contents of which is hereby incorporated herein by reference.

TECHNICAL FIELD

The present disclosure relates generally to a systems and methods of hiring and resume creation and more specifically to a system and method of generating skill centric online resumes with verifiable skills and customized views to assist in hiring.

BACKGROUND

An online resume can be provided by a computer-based application and/or a web-based application.

Online resume systems are prevalent. However, during the hiring process it is incumbent upon an employer to verify the veracity of the skills and education asserted by the applicant. While verification of education is a relatively simple process that can be verified in a number of simply ways, verification of an applicants asserted skills are far more complex. Currently employers use a number of techniques to verify an applicant's skill set, such as questioning during the interview process, online or in-person testing and/or contacting references and/or former employers. However, these methods rely generally upon single date points or information only from a single source and even if the single data point or source provides a good reference, generally the employer has no way of testing the veracity of the data point or of the assertion made by a reference. Thus, creating great potential for an applicant to introduce "puffery" into a resume by asserting skills that the applicant may or may not possess and/or an assertion by an applicant of a level of mastery of a skill that the applicant may or may not possess. Therefore, what is needed are systems and methods for an online resume generation service which can provide skill verification of assertions contained within a resume and associated systems and methods to display the information in a user-friendly and understandable manner.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. General aspects of the disclosure comprise: a method including the steps of: incorporating one or more modules into an online resume generating service to improve a capability of the online resume generating service to provide skill verification corresponding to a resume, the resume stored in database storage of a database of the online resume generating service, the one or more modules configuring one or more computer processors of the online resume generating service to perform operations, the operations including: instantiating the resume corresponding to a first user in the database storage; specifying one or more skills corresponding to the first user and notating, in the resume, records of the one or more skills thus specified. The method further comprises posting a message corresponding to the first user to a first online forum; storing the message in the database storage as a first post corresponding to the first user; tagging the first post with a selected one of the specified skills, thereby attaching a skill tag to the first post, the skill tag corresponding to the first user and the selected one of the specified skills; monitoring the first online forum for posts corresponding to the first user; detecting a post corresponding to the first user that includes the skill tag corresponding to the selected one of the specified skills, and, storing an identity of the detected post with the resume; receiving a query corresponding to the first user and the selected one of the specified skills; and in response to the query, providing the identity of the detected post, thereby providing skill verification corresponding to the resume. Other embodiments of this aspect include corresponding computer systems, apparatus, and computer programs recorded on one or more computer storage devices, each configured to perform the actions of the methods.

Implementations can comprise one or more of the following features: presenting an array of possibly relevant attributes corresponding to the first post; indicating a choice of none or more of the possibly relevant attributes and recording the choice in the database storage, corresponding to a first voter and a user role corresponding to the first voter, thus providing and storing a first rating corresponding to the first post, the first voter, and the user role corresponding to the first voter; determining a weighting value associated with the selected one of the specified skills, responsive to one or more of; a count of posts that include a skill tag corresponding to the first user and the selected one of the specified skills; ratings corresponding to posts that include a skill tag corresponding to the first user and the selected one of the specified skills; user roles of voters who provide the ratings corresponding to posts that include a skill tag corresponding to the first user and the selected one of the specified skills, and ratings profiles of the voters who provide ratings corresponding to posts that can comprise a skill tag corresponding to the first user and the selected one of the specified skills; and in response to the query, providing an indication of the weighting value associated with the selected one of the specified skills, thereby providing skill verification corresponding to the resume. Wherein the first post is categorized as corresponding to a specified type of one or more types, and, elements of the array of possibly relevant attributes are at least in part presented responsive to the specified type; a rating is associated with the first voter and the rating of the first voter is combined with the rating of the first voter associated with the one of the specified skills; the rating associated with the first voter is based at least in part on a comparison of votes cast by the first voter related to postings other than the first posting and votes cast by voters other than the first voter related to the posting other than the first posting. Implementations of the described techniques can comprise hardware, a method or process, or computer software on a computer-accessible medium.

General aspects of the system can comprise the steps of: instantiating in memory a resume corresponding to a first user; identifying a portion of said resume having at least one predefined skill contained within said resume; instantiating posting forums in a database; identifying a posting made by said first user in said database; associating said posting with said at least one predefined skill; associating said posting with said portion of said resume having at least one predefined skill, such that a viewer of a resume can access said posting from said instantiated resume. Other embodiments of this aspect can comprise corresponding computer systems, apparatus, and computer programs recorded on one or more computer storage devices, each configured to perform the actions of the methods.

Implementations can include one or more of the following features: monitoring said posting forum for additional posts corresponding to said first user; detecting said additional posts corresponding to said first user; associating said addition posts corresponding to said first user; identifying said one or more skills within said additional posts; associating said additional posts corresponding to said one or more skills with those portions of said resume of said first user associated with said one or more skills; and receiving a query corresponding to one of said first user and said one or more predefined skills. Implementations of the described techniques can comprise hardware, a method or process, or computer software on a computer-accessible medium.

BRIEF DESCRIPTION OF THE DRAWINGS

Further details of the present invention are explained with the help of the attached drawings in which:

FIG. 15 depicts an exemplary embodiment of an interface for viewing a forum and/or postings.

DETAILED DESCRIPTION

Systems and methods are described herein for while addressing the challenges described above.

Figure 1:
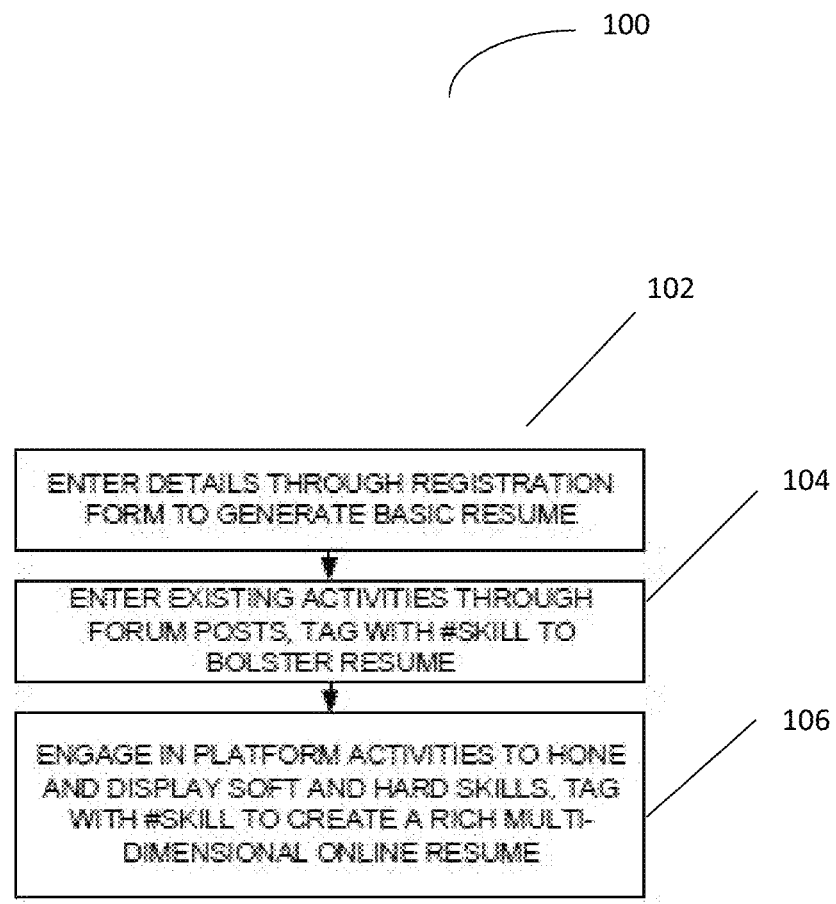
FIG. 1 depicts a high-level block diagram of an embodiment for generating and updating a resume.

Referring now to the drawings wherein like reference characters identify corresponding or similar elements throughout the several views, FIG. 1 a high-level block diagram of an embodiment of a system and method for generating and updating a resume. It should be understood that the embodiments discussed herein are substantially similar in form and function and share one or more of the features discussed in each embodiment although the features may not be shown specifically with reference to the particular embodiment.

Disclosed herein is a system and method to improve hiring by generating skill centric online resumes with verifiable skills and customized views, through an online platform, wherein users can create resumes, and potential employers can browse resumes based on skills. Thus, the system and method can connect job seekers with employers in a structured and efficient manner.

FIG. 1 a high-level block diagram of an embodiment of a system and method for generating and updating a resume 100 in which, personal details/elements can be entered into they system in step 102 via online (or other) portal. In some embodiments, the personal details can include location, name, contact information, education, work experience, academic achievements and/or another know, convenient and/or desired information regarding a user/registrant. The personal details can then be used to create a basic resume for the user/registrant. In step 104, activities for incorporation in the resume can be entered via forum posts and such forum posts can be tagged as skills, with a relevant skill tag such as #"skill", which can provide support for details/elements of a user's/registrant's resume. In addition, in some embodiments, in step 106, a user/registrant can engage in (new or existing) activities (such as online activities within a prescribed forum and/or other activities, such as posting or participation on $3^{rd}$ party forums and/or platforms) to hone and demonstrate soft and hard skills, and, such activities can be tagged with the relevant identifiers, such as #"skill", to create a rich, multi-dimensional, verifiable skills set and set of personal details in the user's/registrant's resume. Accordingly, posting activities can enhance a resume and provide support for assertions made in a resume.

Figure 2:
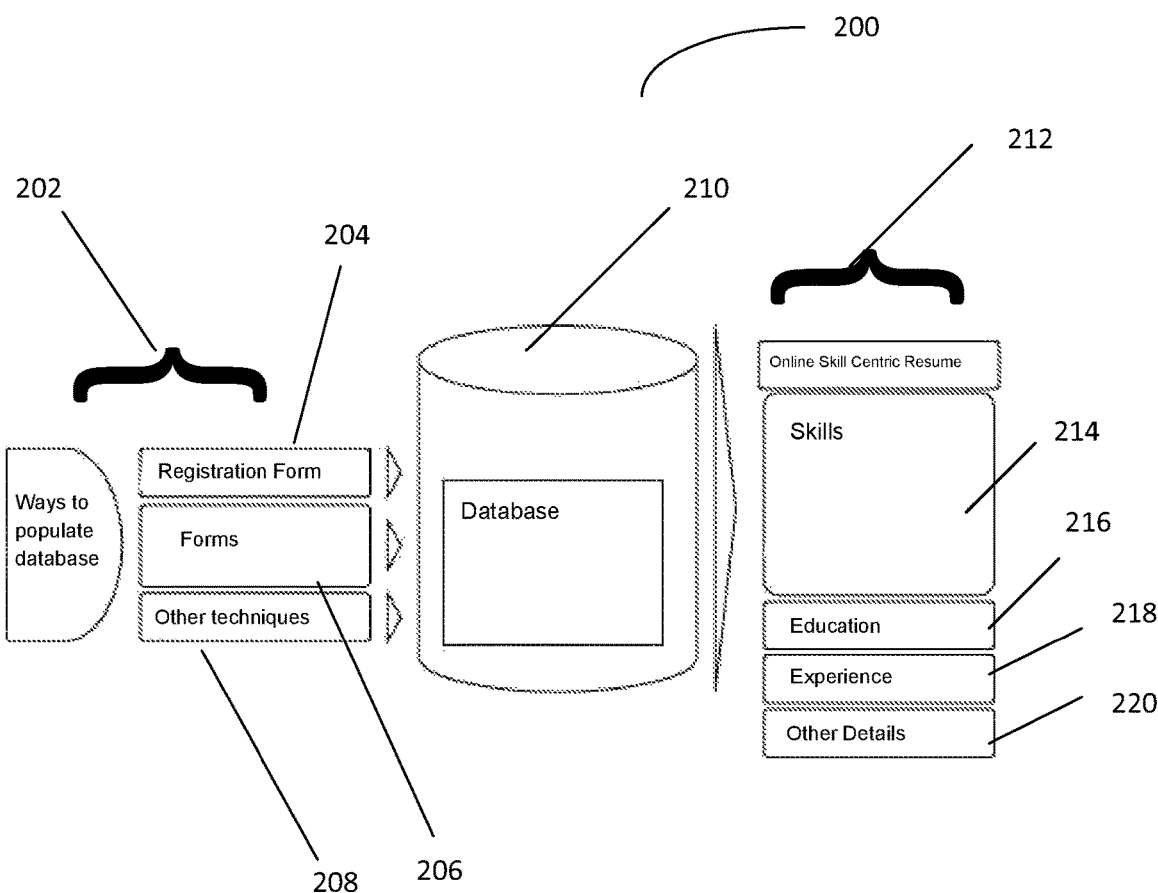
FIG. 2 depicts a high-level system diagram an embodiment for generating and updating a resume.

FIG. 2 depicts a high-level system diagram an embodiment for generating and updating a resume 200. As depicted in FIG. 2, a resume can be populated 202 within the system in multiple ways and via multiple avenues, such as, by way of non-limiting example, a user can fill out a registration form 204 with prescribed fields and/or user modifiable fields, wherein personal information as described above can be collected to generate a resume for the user. In some embodiments, a user can access a plurality of forums 206 and enter information or make postings, wherein each forum can be associated with a particular skill or skills. Additionally, in some alternate embodiments, other techniques 208, can be employed to enter resume information and/or update such resume information, such as manual input and/or data retrieval from other/$3^{rd}$ party sources.

The gathered resume data than then be stored in a databased 210 wherein each post made by a user can be tagged with an identifier or identifiers, such as #"skill", and associated with the relevant skill/component of the specific user's resume. Thus, as a user creates more forum posts and partakes in platform activities, their skill level can increase and their skills can be verified, providing employers more confidence in assertions made in a user's/registrant's resume and making them a more valuable candidate for particular hiring opportunities.

The system can allow potential employers to view users'/registrants' resumes through a viewing engine 212 that can be searched and view-customized by a potential employer to rank order (sub-order) users/registrants resumes in any manner desired by the potential employer, such as by skill(s) 214, by education 216, experience 218 and/or other known convenient and/or employer-specified details 220. As depicted in the skills 214 area, in some embodiments, the degree of confidence of the user's/registrant's abilities and/or qualifications related to a particular detail in a resume can be graphically displayed, such as by a circle of increasing size (wherein size of the circle corresponds to the degree of confidence associated with a particular detail). Further, in some embodiments, the system and method can provide customized viewing of resumes based on the audience, such as viewing modes or displays for peers, mentors, managers, human resources, and/or any other known, convenient and/or desired group, which can include the same information (or a limited set of information), but in a format which may be more appropriate for the identified viewer.

Figure 3:
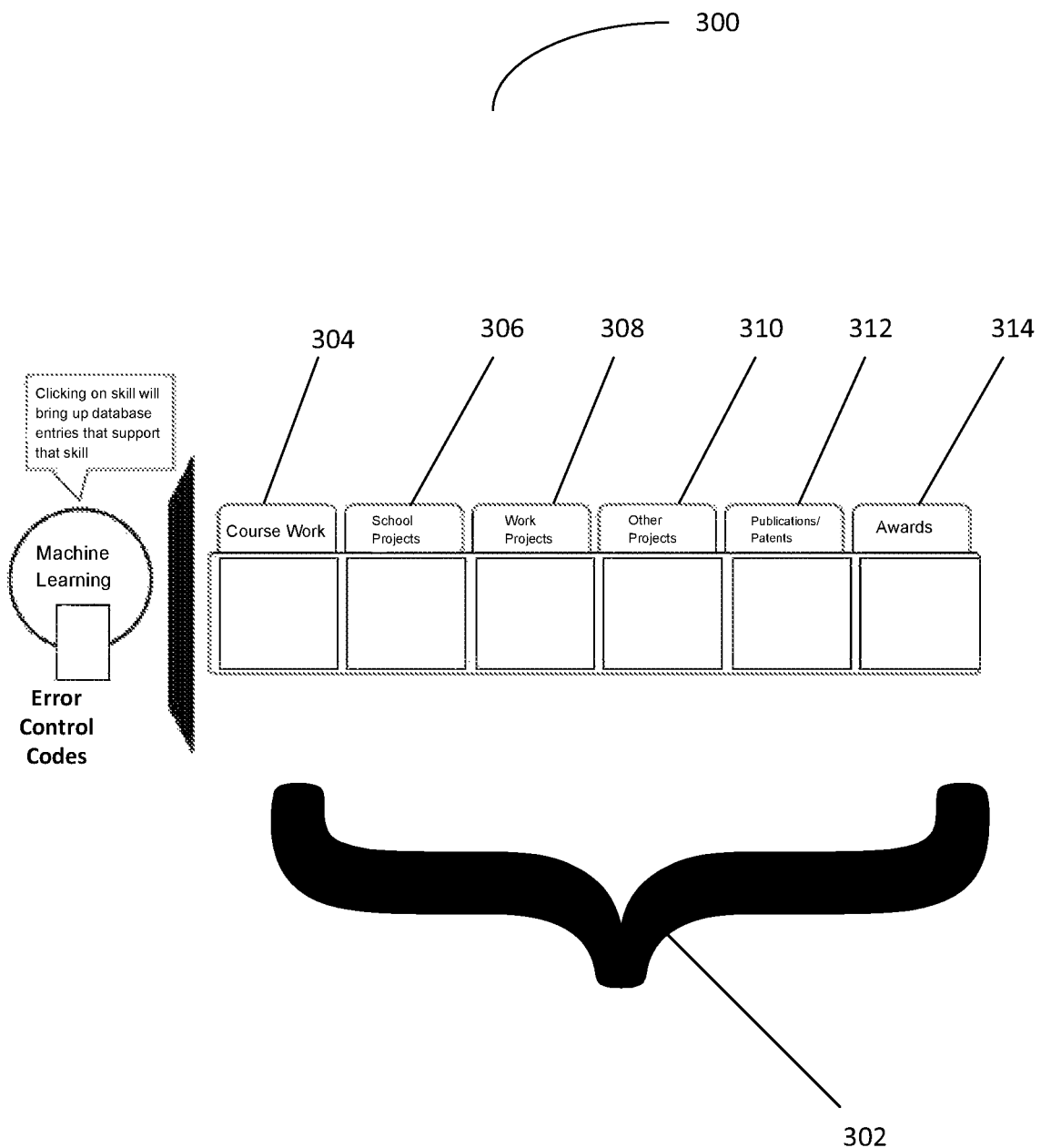
FIG. 3 depicts an embodiment of a user resume.

FIG. 3 depicts an embodiment of a user resume 300. As depicted in FIG. 3, verification of a skill or assertion within a user's/registrant's resume can be performed by dividing the resume 300 into selectable areas 302, such as, by way of non-limiting example course work 304, school projects 306, work projects 308, other projects 310, publications/patents 312, awards 314 and/or any other known, convenient and/or desired area(s). As depicted in FIG. 3, the system allows a potential employer to select an area, such as course work 304, and the system will present all of the user's/registrant's relevant posting/entries related to the user's/registrant's course work so that a user can review the postings/entries. Additionally, in some embodiments, the system and method can comprise a feature allowing the automated matching of job postings on the platform with resumes on the platform, wherein a resume can be identified based upon matching of at least two (or any desired number of) elements via the #"skill" tagging of each resume and a job posting.

Figure 4:
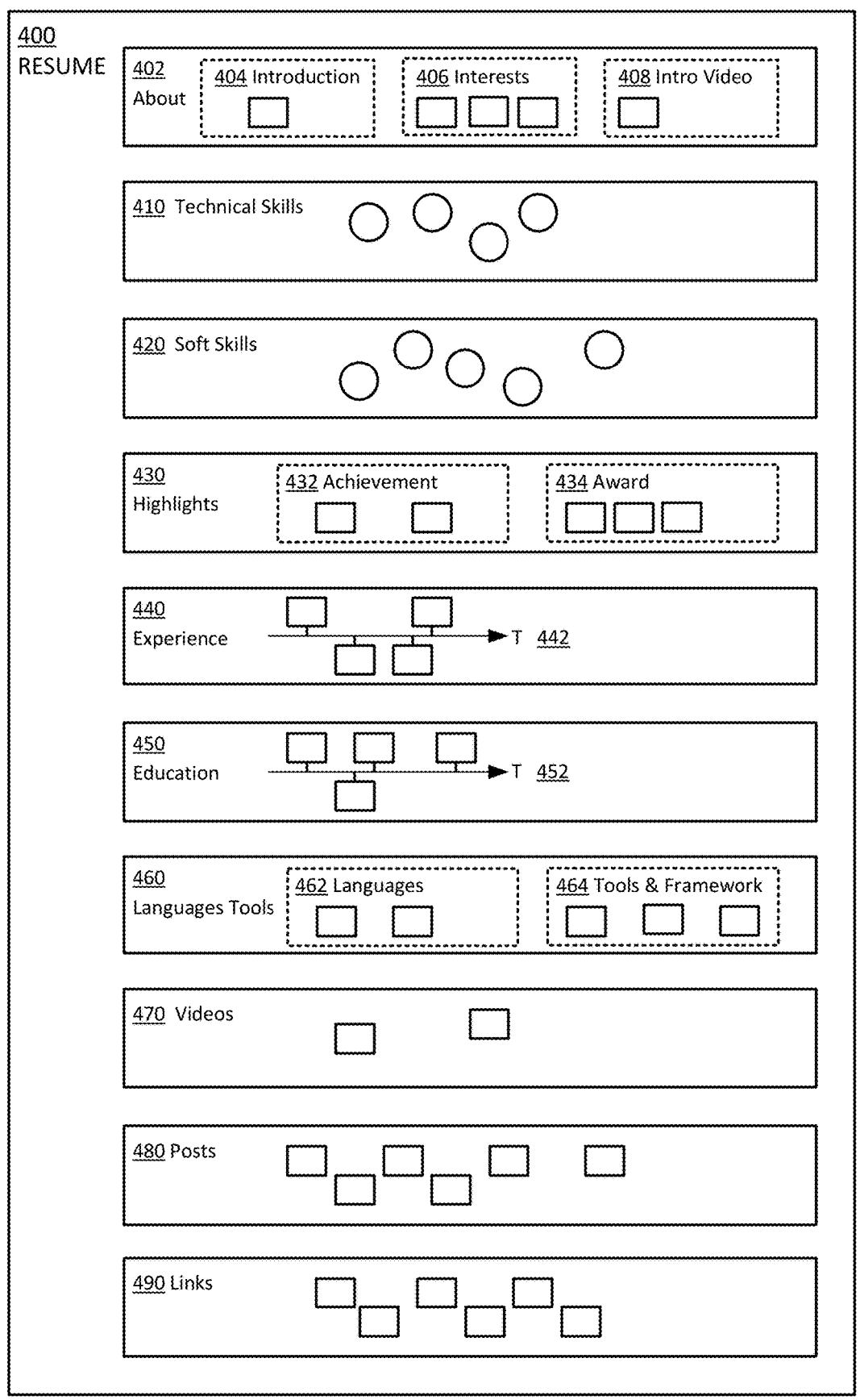
FIG. 4 depicts an exemplary embodiment of an interface for skills verification.

FIG. 4 depicts an exemplary embodiment of an interface for skills verification of a resume 400. As depicted in FIG. 4, in some embodiment the display of a within the system can be presented in grouped sections which, in some embodiments can include sections such as, about 402, technical skills 410, soft skills 420, highlights 430, experience 440, education 450, languages/tools 460, videos 470, posts 480 and links 490. FIG. 4 represents only one non-limiting example of the presentation of a resume, in alternate embodiments the resume sections can be grouped in any known, convenient and/or desired configuration. In the embodiment depicted in FIG. 4, the about section 402 can comprise an introduction section 404, an interests section 406 and a introduction video section 408. In operation, when a viewer of the resume selections on the options, such as the interests section 406, the viewer can be directed to page that presents links to various forums and/or posts made by the user/registrant related to the user's/registrant's interests, such as articles and/or forum posts. Similarly, when a view of the resume selects any of the other selectable sections with the about section 402, the viewer can be presented with the associated postings, articles, forums, video and/or any other known, convenient and/or desired perceptible media that is associated with the user/registrant and their identified skill/attribute.

In some embodiments, sections 402, 410, 420, 430, 440, 450, 460, 470, 480, 490 can additionally include graphical representations of the degree of veracity or verification associated with a particular skill of a user/registrant. By way of non-limiting example, in the technical skills section 410, individual skills can be represented as circles of various sizes or colors and/or circles having portions of an arc in a thicker line (or line of different color) wherein the length of the arc in a thicker line and/or the size of the circle is representative of the degree of veracity or verification associated with the given skill. By way of non-limiting example, if the arc of a circle appeared as only having 50% of the circle in a darker, thicker or heavier line and another circle associated with a skill had an arc that was approximately 90% shaded with a darker, thicker or heavier line, then the view would have more confidence in the skill that indicated an approximately 90% verification. Systems and methods associated with verification of the associated skills will be discussed later in reference to other FIGs.

In some embodiments, skills can be grouped with a section, as depicted by the achievements 432 and awards 434 and/or languages 462 and tools and frameworks 464 groupings depicted in FIG. 4. In some embodiments the skills within a group can be directly accessible via link. However, in alternate embodiments, a user can click on a group and be presented with a series of links associated with specific skills within a group.

Additionally, in some embodiments, where a chronological or timeline presentation of information might be useful, relevant skill information can be presented on a timeline and/or in chronological order with individual skills shown along the timelines 442 452 as depicted in associated with the experience 440 and education 450 sections of FIG. 4. However, in some embodiments, skills can be presented in reverse chronological order. By way of non-limiting example, for education, it is common that the most recently received (or highest achievement) degree is shown first and/or furthest to the left and lesser degrees are shown below or to the right. Additionally, not all languages are read left-to-right. Thus, in some embodiments, appearance and ordering of skills can be customized to conform with alternate reading patterns such as right-to-left or top-to-bottom and relevant information can be translated into the associated and/or desired language(s).

Figure 5:
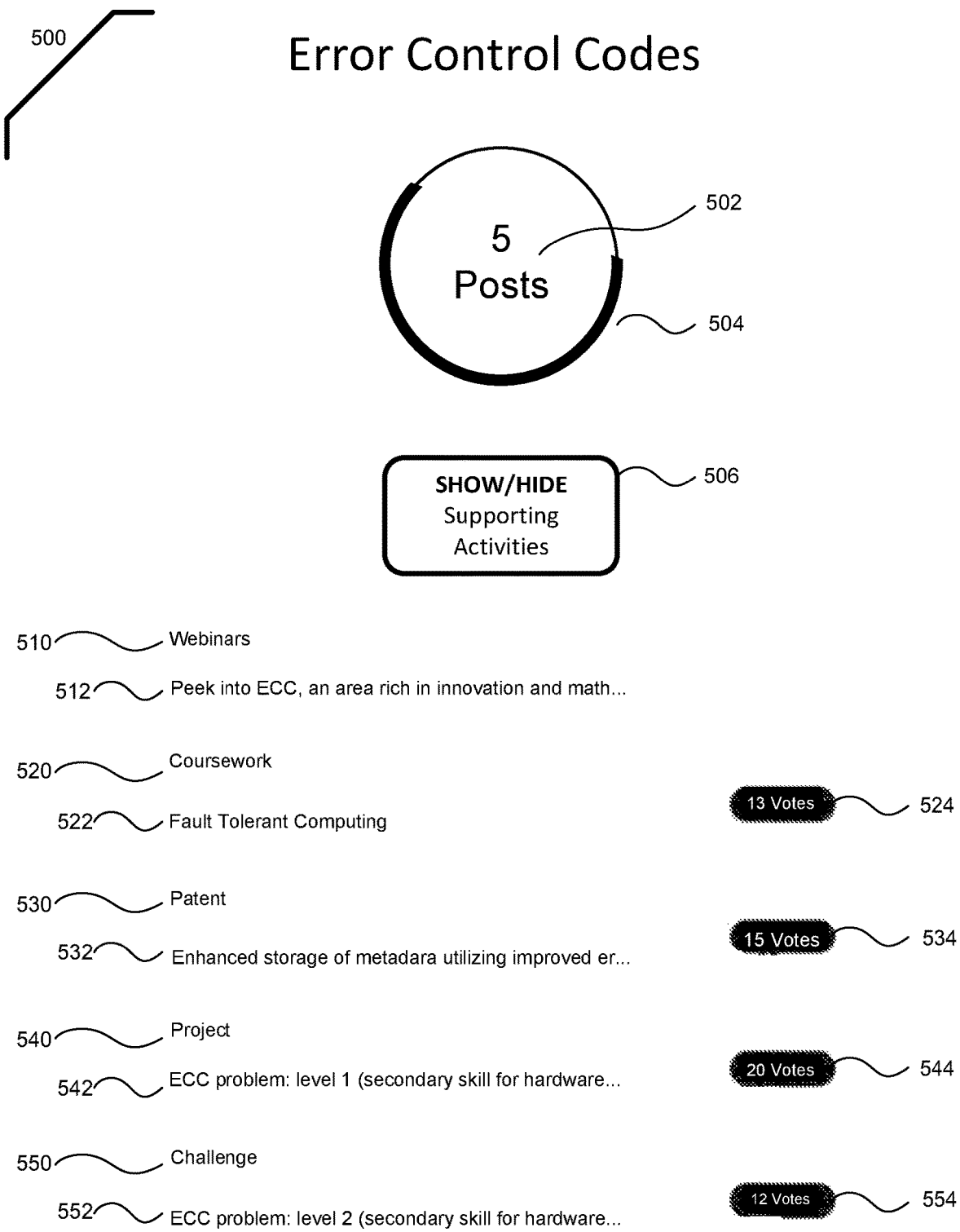
FIG. 5 depicts detailed exemplary embodiment of an interface for skill verification.

FIG. 5 depicts detailed exemplary embodiment of an interface for skill verification 500, that can be presented to a viewer by clicking on, for example, 'Technical Skills' in the resume shown in FIG. 4. In the embodiment depicted in FIG. 5, upon clicking on a given skill, a viewer can be directed to a link that contains a graphical representation 502 of the veracity/verification of the skill 502. In the embodiment depicted in FIG. 5, the graphical representation 502 can provide the user with information such as the number of postings made by the user that are associated with the relevant skill and a circle that is, by way of non-limiting example, shows a thicker arc 504 covering approximately ⅔ of the circle indicating approximately a 66% verification of the skill. However, in alternate embodiments, as previously described, this can be accomplished using a circle that has a diameter proportional to the degree of verification, or a circle having a fixed or variable size and being filled in to a degree related to the degree of verification and/or a circle having a fixed or variable size of a specific color—by way of non-limiting example, if a skill is considered verified, the circle may be green, but if the skill is not considered verified the circle may appear orange, yellow or red indicating reduced levels of confidence in the skill.

Additionally, in some embodiments, an option 506 to display or suppress the associated activities that have been used to support the verification of the skill. If the option 506 is set to display the associated posts/activities that support the verification of the skill, then the associated skills can be presented also along with basic information associated with the verification of the skills. By way of non-limiting example, in the embodiment depicted in FIG. 5, associated posting related to a skill can be webinars 510, coursework, 520, patent(s) 530, project(s) 540, challenge(s) 550 and/or any other known, convenient, desires and/or related tag that is related to the relevant skill verification 500. In the embodiment depicted in FIG. 5, each area can include links to the relevant postings or forums 512, 522, 532, 542, 552 in which the information can be directly found and/or a information related to a vote count 524, 534, 544, 554 for the relevant postings or forums that show how others have evaluated the postings and/or whether others have found the posting helpful and/or accurate. In some embodiments, this can be a 1 to 1 counting system wherein the votes of all individuals evaluating a posting of a user/registration can be equally weighted. However, in alternate embodiments, this can be a weighted indication of the court of votes wherein the individual evaluators of the postings are assigned weights based upon the degree of accuracy of veracity that is to be associated with their review of a posting.

Figure 6:
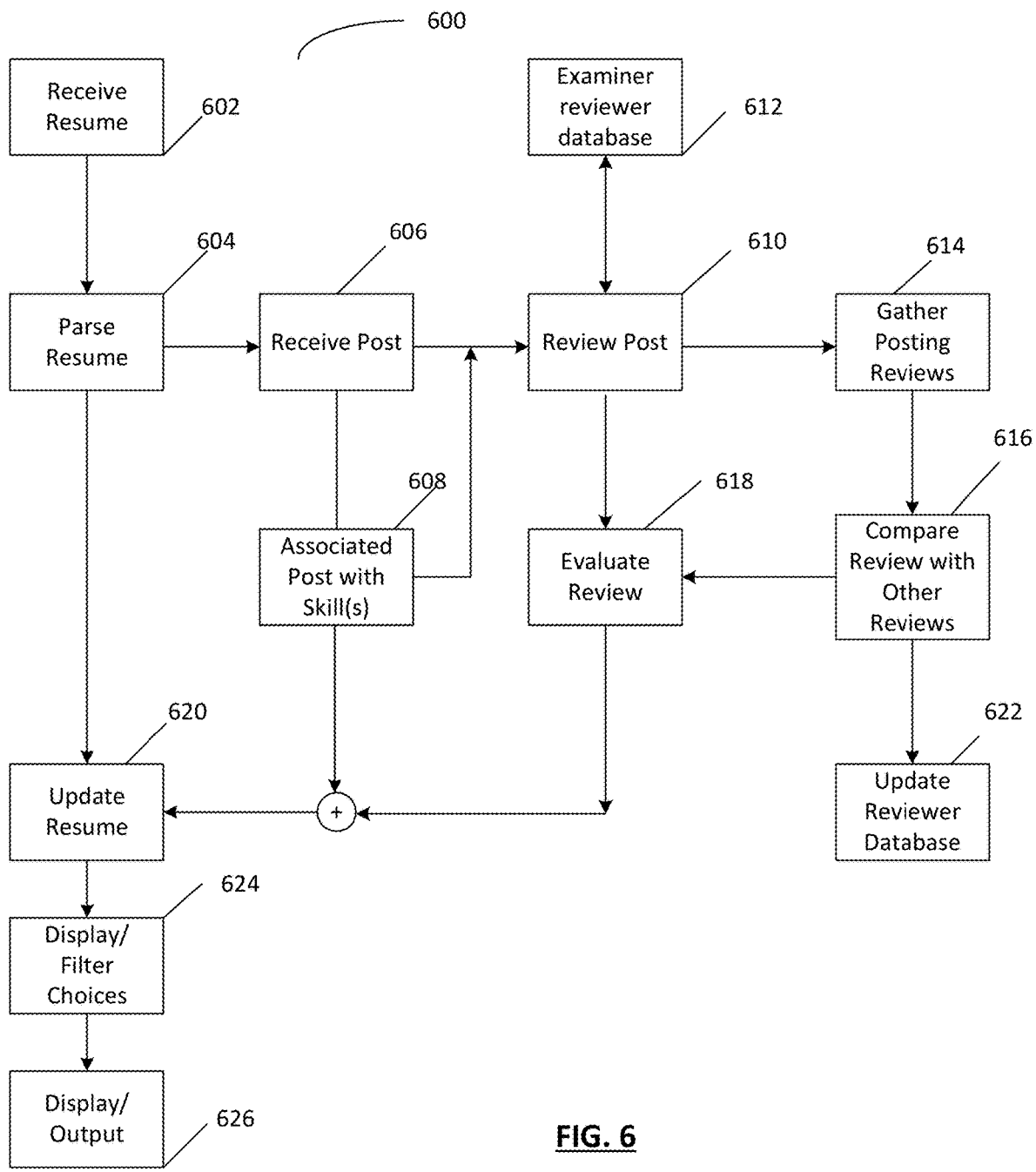
FIG. 6 depicts a block diagram of a system and method for generating and updating a resume with skills verification.

FIG. 6 depicts a block flow diagram of a system and method for skills verification, resume updating, filtering and display of a resume. In step 602, resume information is received and then parsed 6040 to categorize various skills/elements of the resume into associated skills. Postings associated with a user/registrant can then be accessed in step 606 and similarly categorized in step 608. In some embodiments the categorization of the resume elements and postings can be manually categorized and associated with one or more skills. However, in alternate embodiments, the resume elements and postings can be categorized and associated with one or more skills in an automated manner using key words and/or phrases and/or any other known, convenient and/or desired technique. In some embodiments, a user/registrant can modify categorization as desired and/or add additional categorization to associate a posting with additional and/or different skills. In some embodiments the categories can be broad groupings or broad technical fields which can comprise sub-categories of more specific skills within a broader high-level category of skills. Such categories and sub-categories can be identified from a pre-defined system set of categories and/or sub-categories which can be modified from time to time. However, in alternate embodiments, such categories and/or sub-categories can be user updated or user generated. In still further alternate embodiments, such categories and sub-categories can be a user modifiable pre-defined set of categories and/or sub-categories. The categories and sub-categories can comprise any known, convenient and/or desired identifications.

In step 610 a post can receive a review and, in some embodiments, an associated rating from viewers of the post. Then in step 612 a reviewer database can be accessed to determine a rating associated with a reviewer. Ratings of reviewers can be based upon any known, convenient and/or desired criteria, such as veracity/accuracy of previous reviews, academic standing, degree of familiarity with subject area of the posting and/or any other know, convenient and/or desired criteria. In some embodiments, certain posting reviewers, such as university professors or verified former employers (and/or any other known, convenient and/or desired reviewer type), can be assigned a perfect or 100% veracity/accuracy rating. However, in alternate embodiments, a reviewer can be assigned a veracity/accuracy rating based upon degree of agreement with other reviewers' evaluations as evaluated in steps 614 and 616. In step 614 evaluations of the posting can be gathered and then in step 616 the current evaluation of the posting by the reviewer can be compared to the average (or any other combination of previous evaluations of the posting) and the degree of veracity/accuracy of the current reviewer, based on agreement with the average of previous reviews (or any other combination of previous evaluations of the posting) can be determined. Based on the degree of veracity/accuracy of the current review, a weight associated with the reviewer can be increased and/or decreased and a database associated with the reviewers can be updated in step 622. The review by the reviewer can then be combined with the reviewer's weighting and the review associated with posting can be evaluated in step 618 and combined with the skills tags and posting from steps 608 and used to update the resume of the user/registrant in step 620. Then in step 624 a viewer of the system can apply filter choices as desired and users'/registrants' resumes can be displayed as desired.

By way of non-limiting example, if a user makes a posting and a reviewer evaluates that user's posting as having an accuracy/veracity of 5 (on a scale of 1-5), but others have evaluated the user's posting as having an accuracy/veracity of 2 (on a scale of 1-5) the reviewer's weigh will decrease toward zero, as the reviewers evaluation of the user's post is not calibrated with the opinions of other reviewers. Similarly, if a user makes a posting and a reviewer evaluates that user's posting as having an accuracy/veracity of 4 (on a scale of 1-5), and 90% of others have evaluated the user's posting similarly as having an accuracy/veracity of 4 (on a scale of 1-5) the reviewer's weight will increase toward the maximum weighting possible, as the reviewers evaluation of the user's post is calibrated with the opinions of other reviewers. As noted, some reviewer weights can be fixed and/or can be fixed for particular skills, but not for all skills. By way of non-limiting example, if a user makes a posting and a professor-reviewer evaluates that user's posting as having an accuracy/veracity of 2 (on a scale of 1-5), but others have evaluated the user's posting as having an accuracy/veracity of 5 (on a scale of 1-5) the professor-reviewer's weight will remain the same, as the professor-reviewers weighting is fixed. In yet still further embodiments, if a user makes a posting and a professor-reviewer evaluates that user's posting as having an accuracy/veracity of 1 (on a scale of 1-5), but others have evaluated the user's posting as having an accuracy/veracity of 5 (on a scale of 1-5) the other non-professor-reviewer's weights can be decrease toward zero, as the reviewers evaluation of the user's post is not calibrated with the professor-reviewer's evaluation. It should be noted that the 1-5 scale is arbitrary in the above-provided non-limiting examples, and any known, convenient and/or desired metric can be employed.

Figure 7:
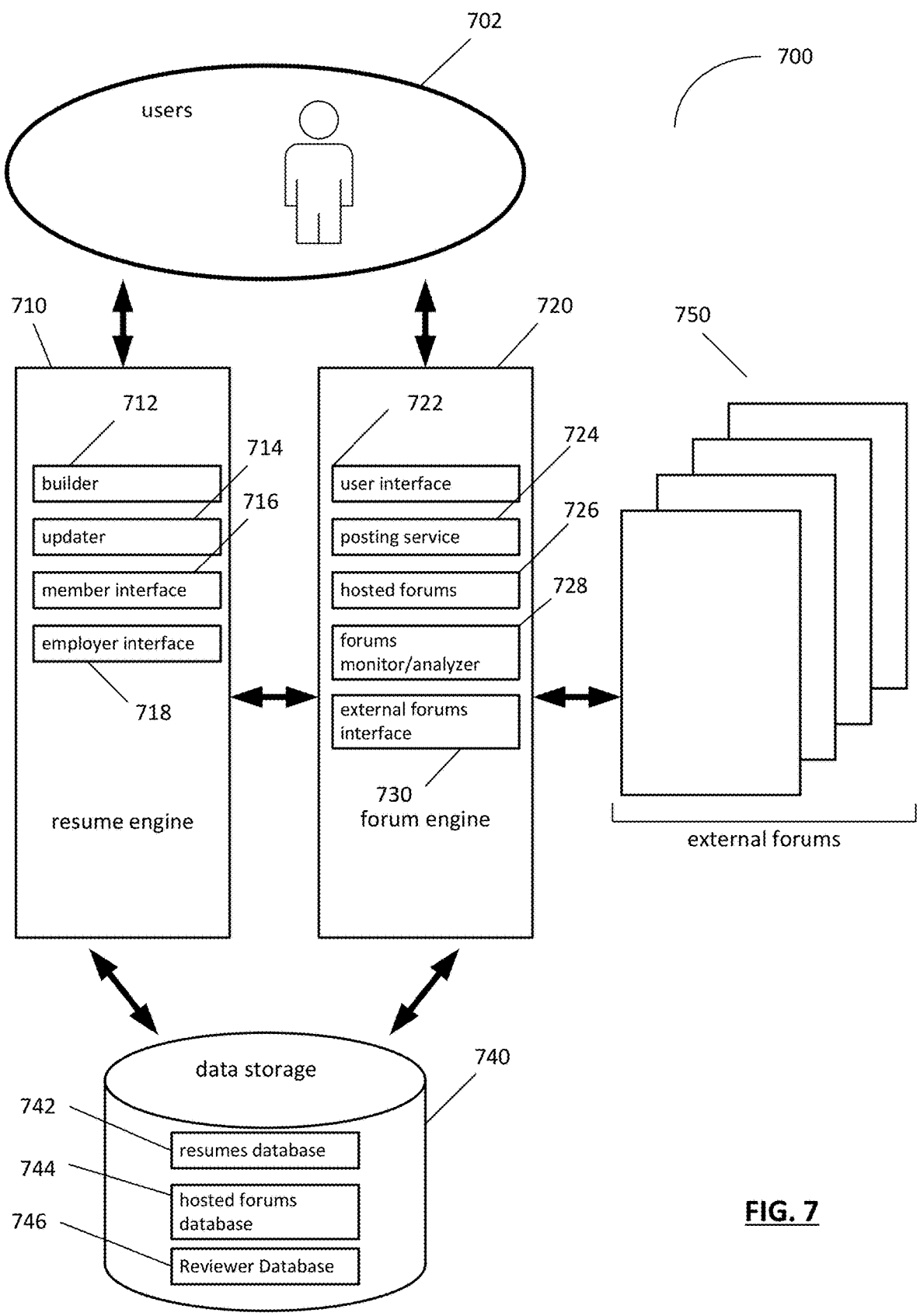
FIG. 7 depicts an exemplary embodiment of a system for generating and updating a resume.

FIG. 7 depicts a block diagram of a system and method for generating and updating a resume with skills verification 700. The embodiment depicted in FIG. 7 of the system and method for generating and updating a resume with skills verification 700 can comprise a plurality of users 702, a resume engine 710, a forum engine 720, a data storage 740 and, in some embodiments, external forums 750. In the embodiment depicted in FIG. 7, the resume engine 710 can comprise a resume builder element 712 that can be used to solicit and/or obtain information about users 702 and/or a user's skills, a resume updater element 714 that can be used to update information about a user and/or a user's skills, a member interface 716 that can allow a user to interact with any one or more components of the system associated with the user's resume and an employer interface 718 that can allow potential employers to access information regarding users' resumes and access related forum information associated with individual user's resumes. Information regarding the user's resume can be stored in the date storage 740.

The forum engine 720 can comprise a user interface 722, a posting interface 724, hosted forums 726, a forums monitor/analyzer 728 and an external forums interface element 730. The user interface can allow users (reviewers, employers and/or user's/registrants) to create unique accounts and manage basic information associated with their accounts, the posting service 724 can allow users/registrants to create and/or categorize postings that can be tied to their resumes in the resume builder and associated data storage 740. The hosted forum 726 can be virtual locations in which users/registrants can post various information regarding topics related to their skills for review by others and a virtual location in which reviewers can review/evaluate the postings of others and/or communicate interactively with other users/registrants, reviewers and/or employers. The forums monitor/analyzer 728 can automatically detect updates to the forums and update a user's/registrant's resume with associated information related to particular skills. In some embodiments, the forum engine 720 can comprise an external forums interface that allows the forum engine to actively access forum sites run by third parties and actively access or scrape information from those external forums for use in updating/verifying a user's/registrant's skills.

Data associated with the users'/registrants' resumes 742 can be stored in the data storage and additional information, such as information related to the forums 744 (internal and/or external) and/or the database of reviewer's weightings 746 can be stored in the data storage.

In operation, a user/registrant 702 can enter resume information into the resume engine 710 and the resume information can be categorized into relevant skills. A user/registrant can then post to forums (internal or external) and the postings can be evaluated by others. The postings can further be categorized into the relevant skills and used to enhance the information contained in a user's/registrant's resume. An employer can then access the resume engine and sort potential candidates using any known, convenient and/or desired mechanism and then access the verification information associated with identified skills which is delivered to the potential employer from the forum engine 720 and/or the data storage 740.

Figure 8:
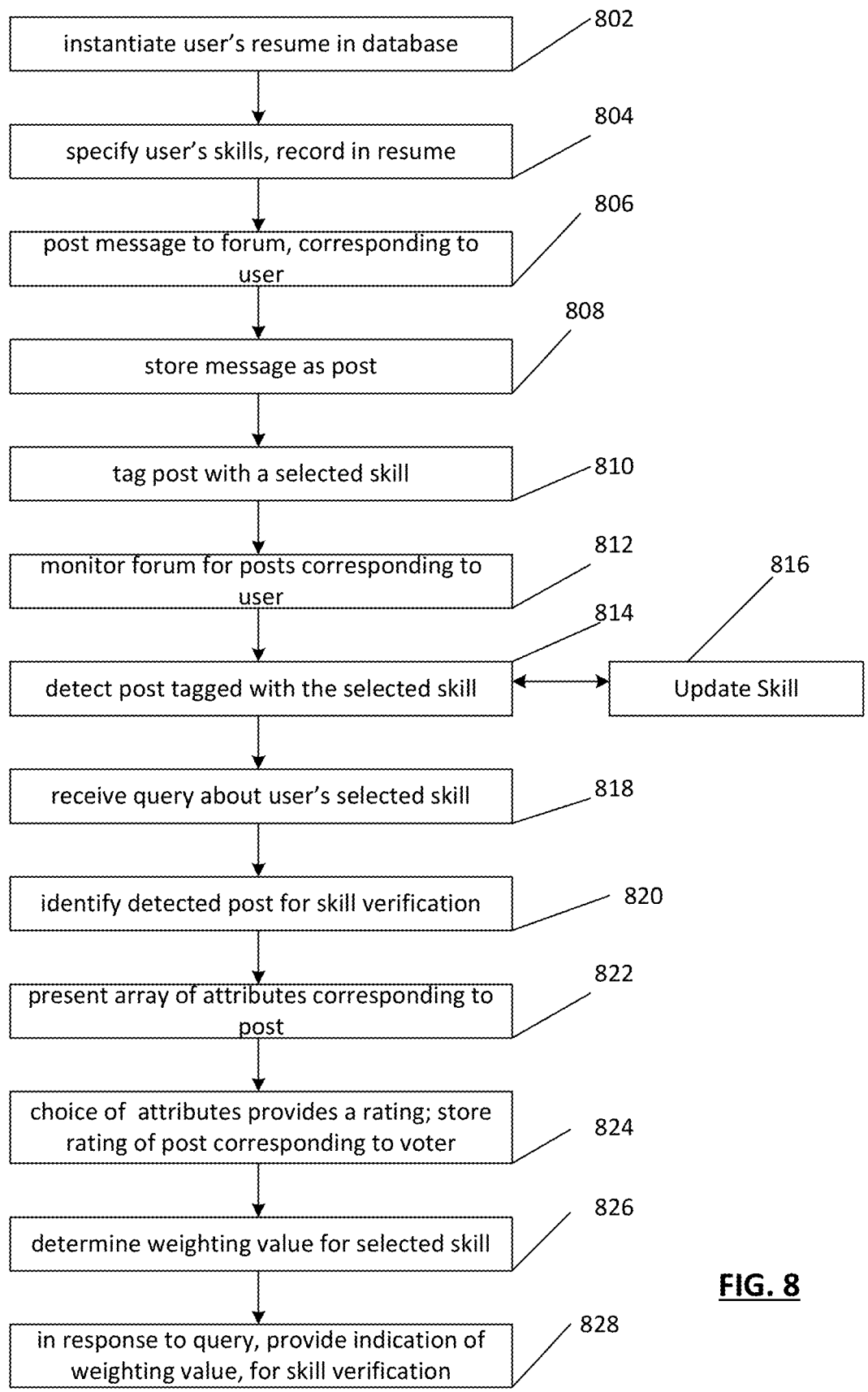
FIG. 8 depicts a block diagram of an embodiment for skill verification

FIG. 8 depicts an exemplary embodiment of a system for generating and updating a resume 800. In the embodiment depicted in FIG. 8, in step 802 a user's/registrant's resume can be instantiated in a resume database and then in step 804 a user's skills are extracted and categorized from the resume. Postings by the user/registrant are then identified within a forum in step 806, stored in a database associated with the user/registration in step 808 and then tagged/associated 810 with a user's/registrant's identified skills and/or new skills are created for the user, associated with the user/registrant. The system can then monitor 812 the forum(s) for activity corresponding to new posts or existing posts associated with the user/registrant and the user's/registrant's skills and detect 814 any activity associated with the user/registrant in the forum(s) and update a user's skill accordingly 816.

In step 818 if the system receives a request for the user's/registrant's resume, the system can identify 820 all posts related to the user's/registrant's skills and present the resume with the user's/registrant's skills. If in step, a user selects a particular skill within a user's/registrant's resume, the associated skills can be presented in step 822 and associated ratings can also be presented in association with those skills 824 which can include a weighted value associated with such skills 826 and in some embodiments information regarding the weighted value can be presented 828 including the relevant posts and evaluations.

Figure 9:
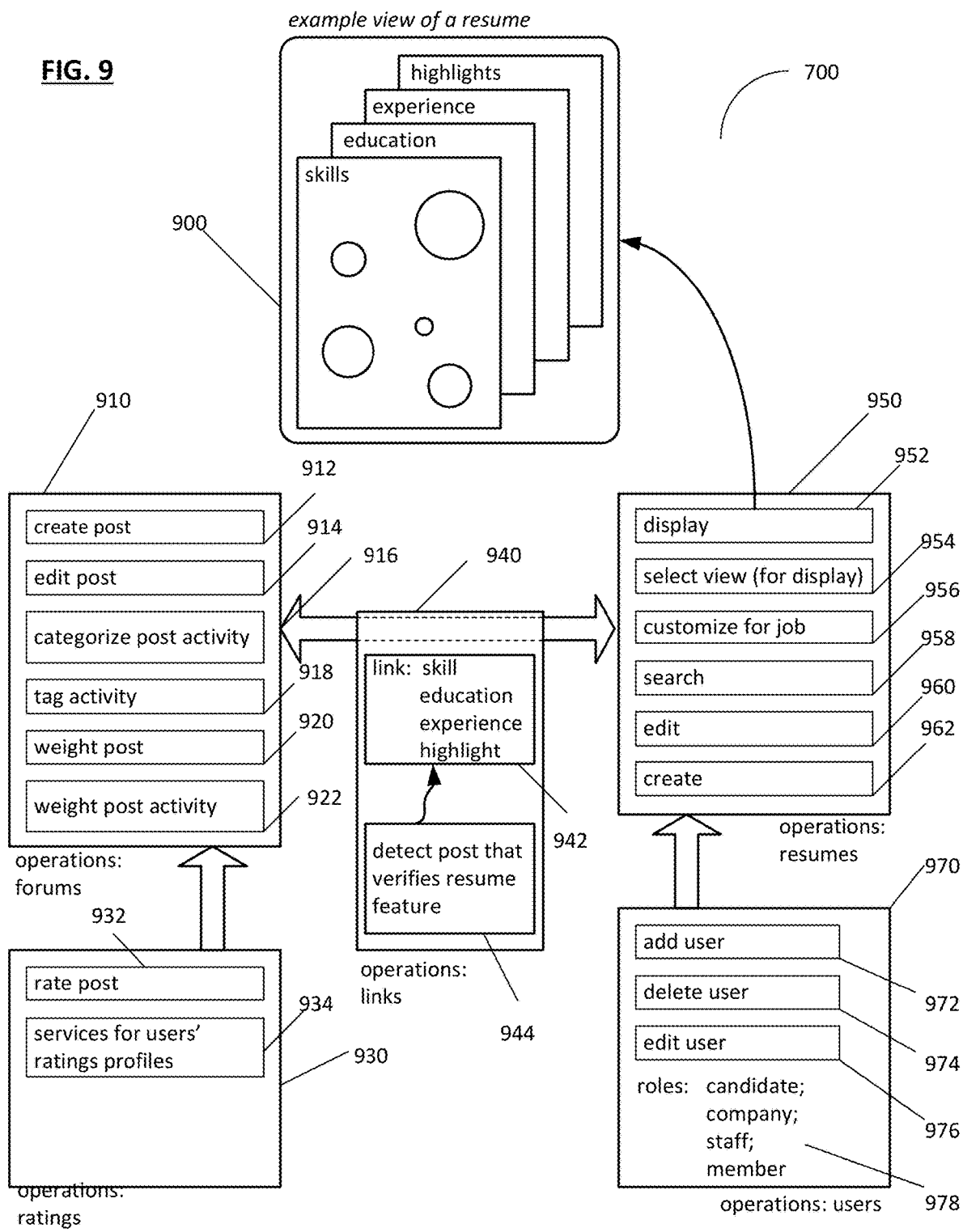
FIG. 9 depicts a block diagram of an embodiment of a system for skill verification.

FIG. 9 depicts a block diagram of an embodiment of a system for skill verification 700. In the embodiment depicted in FIG. 9, the system 700 can be comprised of a forums system 910, a ratings system 930, a linking system 940 a resume generation system 950 and a user's system all configured to interactively deliver a resume 900 with associated verifiable skills.

In operations the forum(s) system 910 allows a user/registrant to create 912 and edit 914 posts which can be categorized 916 and tagged 918 (either manually or automatically or a combination of both) with associates skills for a user. The postings can be weighted appropriately 920 via the ratings system 930. The ratings system 930 can receive ratings 932 related to posts by users/registrants and maintain data related to the quality/weight 934 of a reviewer such that the posting activity 920 can be updated accordingly. Such weighting can be accomplished in accordance with any known, convenient and/or desired weighting system including such systems as described herein. The linking system 940 can be used to detect changes in the forum(s) 944 update skills 942 and link postings in the forum(s) to a user's/registrant's resume 900.

The resumes system 950 can be used to construct a resume 900 for a user/registrant upon demand and in any desired configuration or display order requested. The location for display 952 can be specified, the sequence of items for display can be specified in 954 and/or a customized job-specific query can be constructed to retrieve resumes that meet specified criteria 956. In some embodiments a work, skill or other type of search 958 can be conducted to sift resumes and queries can be edited 960 or created 962 as desired so that resumes can be screened/displayed as desired. They system 700 can comprise the users system 970 that allows the addition 972 of users, deletion 974 of users, editing 976 of users and assignment of user roles 978 to system users.

In operation, a potential employer can register with the users system 970 and then construct a query via the resumes system 950. The resumes system will then gather user information from the user's system related to the resume and the links system 940 will retrieve posts and posting reviews associated with posts and from the forums system 910 and the ratings system 930 and present a resume 900 for a user/registrant that includes the user's/registrant's skills along with links and ratings associated with user's/registrant's asserted skills.

Figure 10:
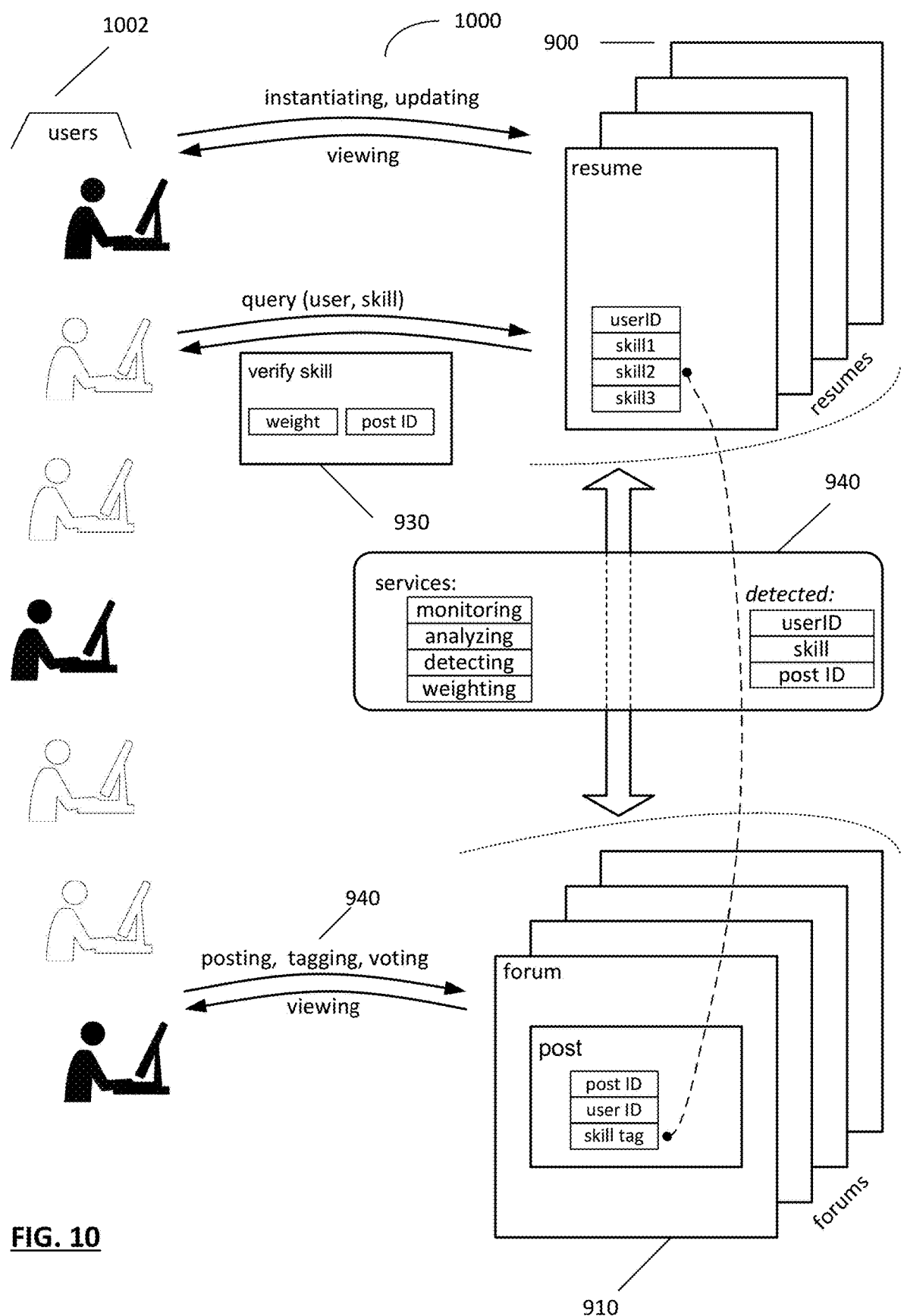
FIG. 10 depicts a block diagram of a system for linking between a forum post and a resume.

FIG. 10 depicts a block diagram of a system for linking between a forum post and a resume 1000. In the embodiment depicted in FIG. 10, the users (which can include user/registrants, potential employers, reviewers and/or any other known, convenient and/or desired persons or entities) can access the system 1000. User/registrants can create and update their resumes 900 with the system and the resumes can be categorized into skills groups. Such categorization can be performed manually, automatically and/or a combination of manually and automatically. Additionally, users/registrants can post 940 within forum(s) 910 and such postings can be linked to the resumes of the posting user/registrant via the linking system 940. Additionally, within the forums 910, users can rate/evaluate/weight user/registrant postings. The linking system 940 can then combine the postings related to the skills and combine them with the weights of the skills to provide a verification of the user's/registrant's skill asserted in their resume 900. A potentialemployer-user can then query the system based on a specific skill or skills and/or any other known, convenient and/or desired query and be presented with one or more user/registrant resumes 900 based upon the query. The presented resume 900 can include the resume information asserted by the user/registrant and the skills categorization along with links to the postings associated with that user's/registrant's skills and, in some embodiments, with associated weights and/or evaluations of the user's/registrant's skills based upon the votings and ranking provided in the forum.

Figure 11:
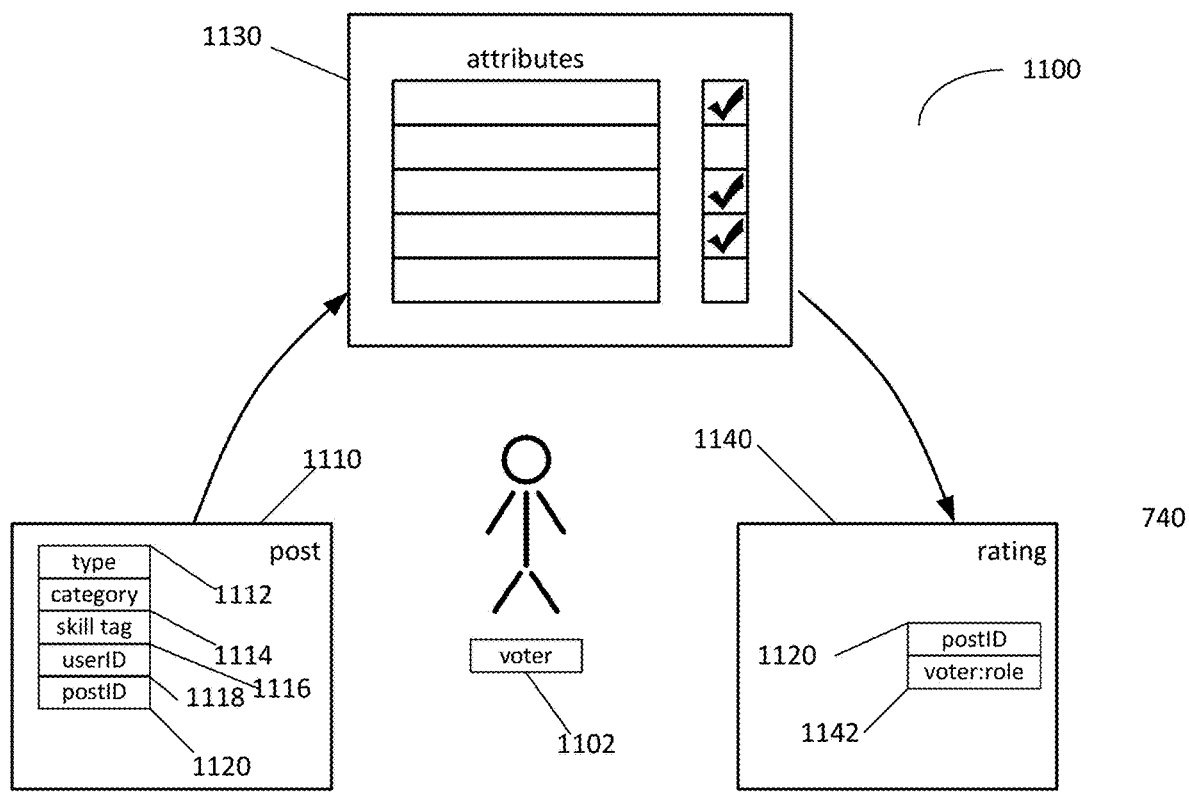
FIG. 11 depicts a block diagram of an exemplary embodiment of a system for rating for a post.

FIG. 11 depicts a block diagram of an exemplary embodiment of a system for rating for a post 1100. In the embodiment depicted in FIG. 11, the system 1100 can comprise a posting system 1110, an attributes linking system 1130 and a rating system 1140. In operation, user/registrants can post in the posting system 1110 and the posting can be categorized to include a type of posting 1112, a category of posting 1114, a skill tag 1116, a user ID 1118 and a posting ID 1120, such that a posting can be associated with a user's/registrant's resume and the particular skills associated with that user's/registrant's resume. A voter 1102 can then evaluate the posting. Attributes 1130 of the posting and the voter 1102 can then be compared to determine a weight that should be associated with a voter's rating. Additionally, the posting ID 1120 and the voter's roll connection with the user can be recorded in the rating system 1140. By way of non-limiting example, if the user posts in the forum an article about electrical fields, and the voter were professor of electrical engineering, there would be a high degree of correlation between the subject of the posting and the voter's expertise and thus the weighting of the voter's evaluation would be high. However, if the voter were a professor of French literature, then there would be little correlation between the subject of the posting and the voter's expertise and thus the weighting of the voter's evaluation would be low. Similarly, in some embodiments, the evaluation of a user's/registrant's post by a former employer of the user/registrant can be assigned a specific weight. As previously noted, other systems related to the degree of correlation of a voter's vote with some metric of previous votes can also be used to evaluate and weight the voter's vote.

Figure 12:
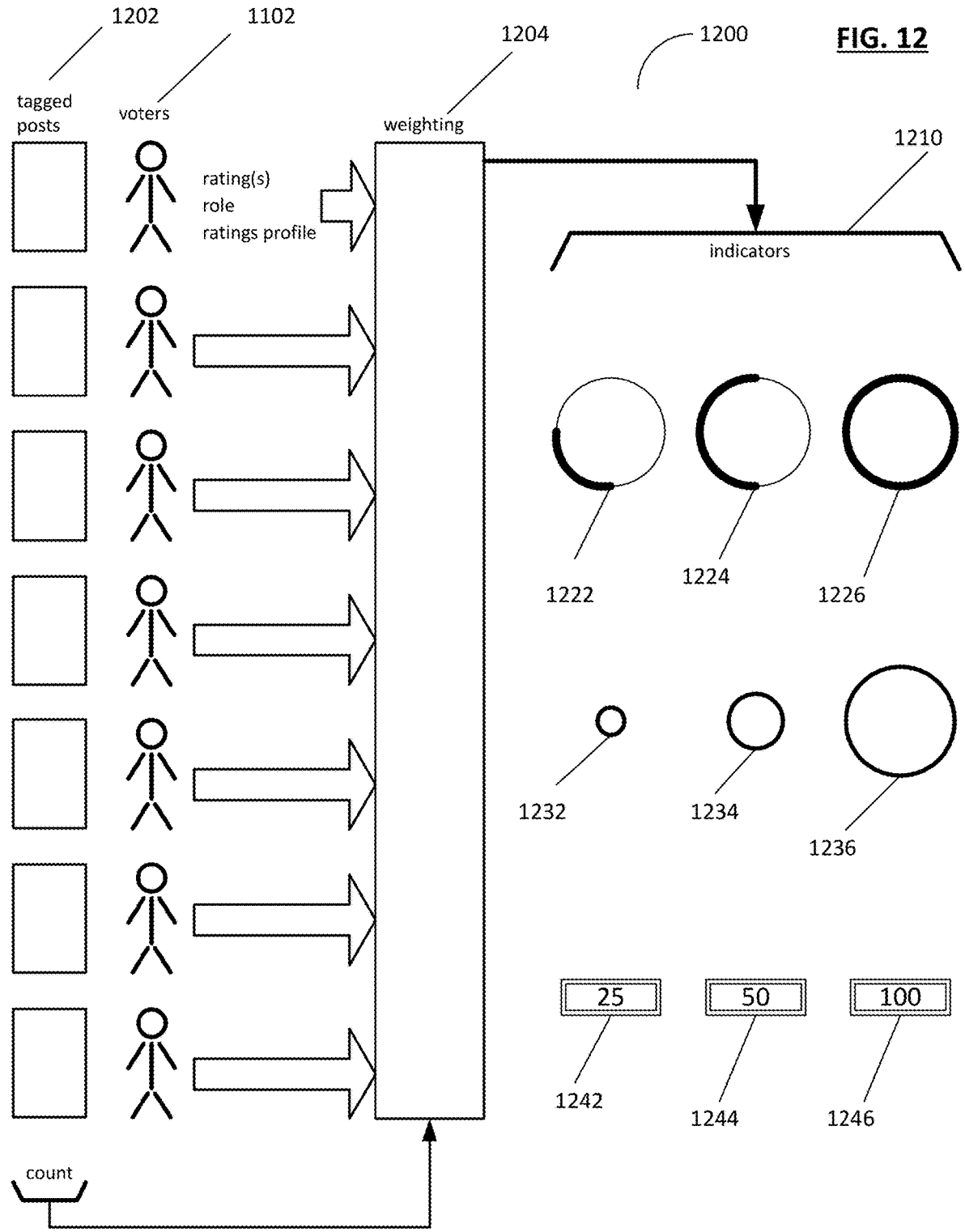
FIG. 12 depicts a block diagram of an exemplary system for weighting and displaying indicators of veracity associated with a skill.

FIG. 12 depicts a block diagram of an exemplary system for weighting and displaying indicators of veracity associated with a skill 1200. In the embodiment depicted in FIG. 12, tagged posts 1202 can be evaluated by voters 1102 and the voter's rating can be combined with the voter's weight 1204 and then evaluation of a particular skill can be displayed 1210. In some embodiments, the display of the degree of confidence, veracity or verification of the skill can be presented by a circle with a portion of an arc length having a different thickness 1222 1224 1226 whereby circles having longer thickened arc lengths indicate that a skill is more verified. In alternate embodiments, the same information can be presented using the size of a circle 1231 1234 1236 or by a pure numerical value 1242 1244 1246.

Figure 13A:
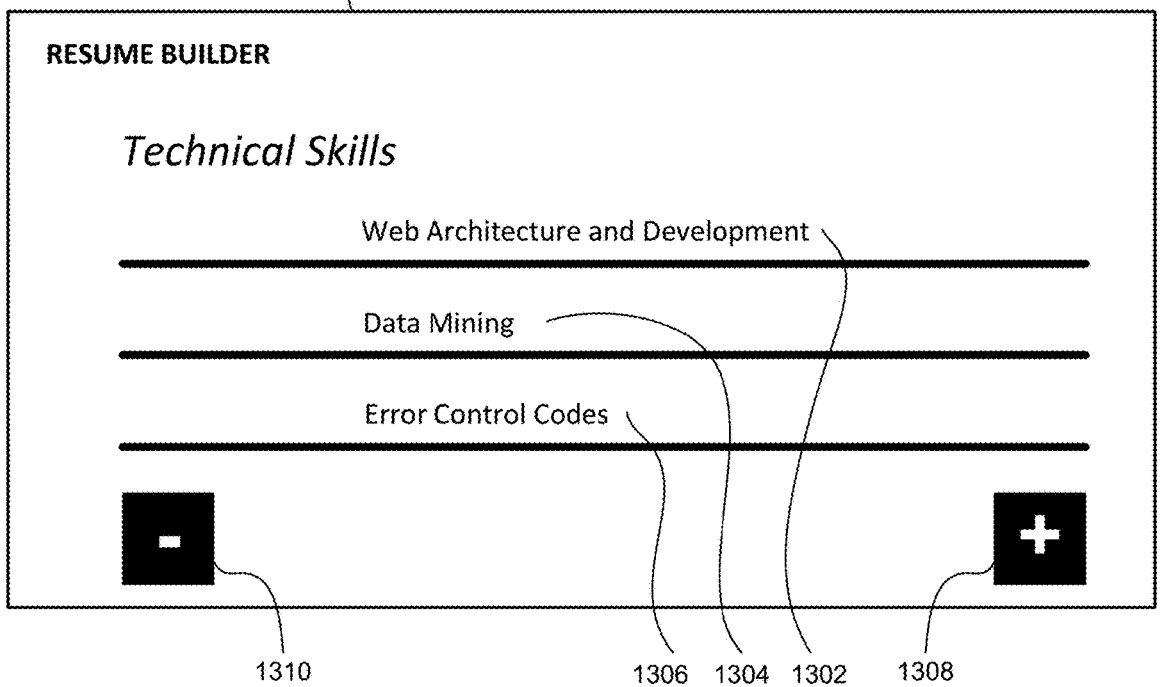
FIG. 13A depicts an exemplary embodiment of a system for adding components to a resume.

FIG. 13A depicts an exemplary embodiment of a system for adding components to a resume 1300. In the embodiment depicted in FIG. 13A, exemplary technical skills 1302 1304 1306 are shown as being added to a resume. A user/registrant can navigate the system by using buttons 1308 1310 to add, remove or edit skills within the user's/registrant's resume, It should be noted with particularity, that while the addition/editing form for skills is presented in a particular format, any known, convenient and/or desired format can be employed.

Figure 13B:
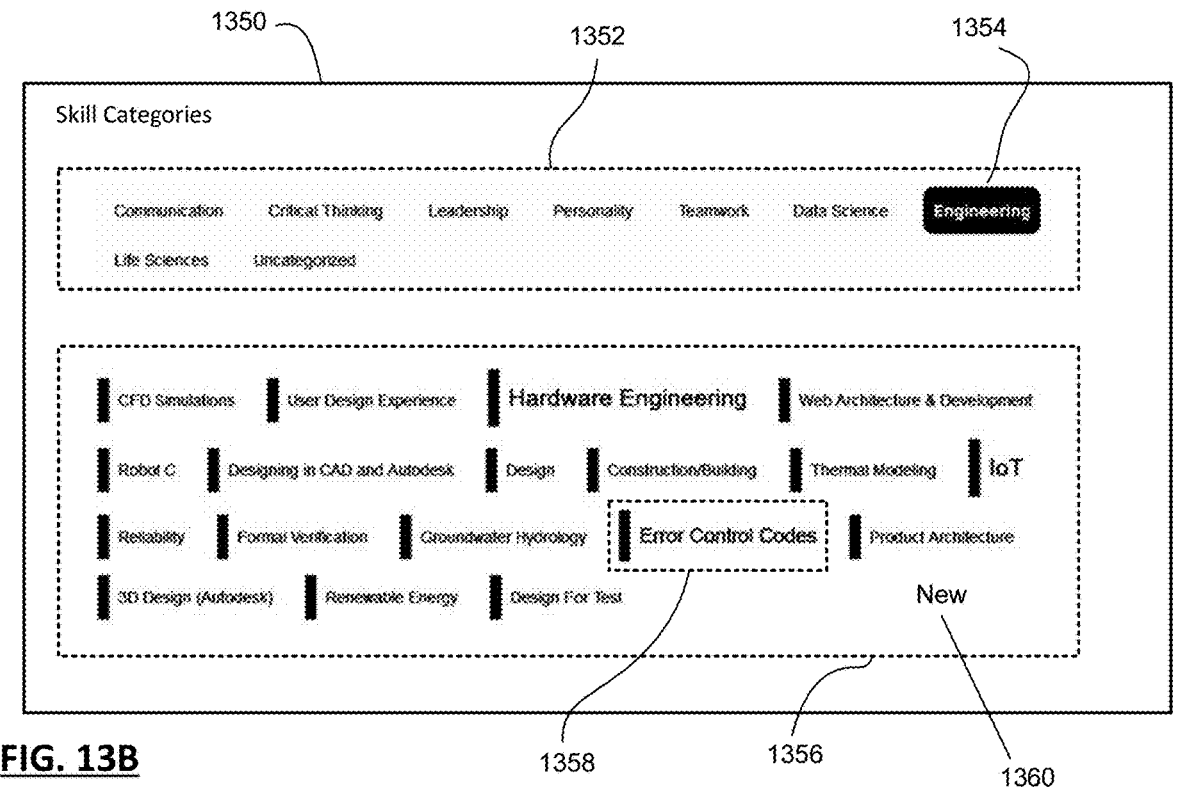
FIG. 13B depicts an exemplary embodiment of a system for categorizing skills contained within a resume and/or categorizing a post.

FIG. 13B depicts an exemplary embodiment of a system for categorizing skills contained within a resume and/or categorizing a post 1350. In the embodiment depicted in FIG. 13B, skills in a posting can be categorized into high-level categories (that group multiple categorizations together) and sub-categories of the high-level categories using selectable options 1352 1356 whereby a user can select a category 1354 and a sub-category 1358 and/or, in some embodiments, enter or propose a new options 1360.

Figure 14:
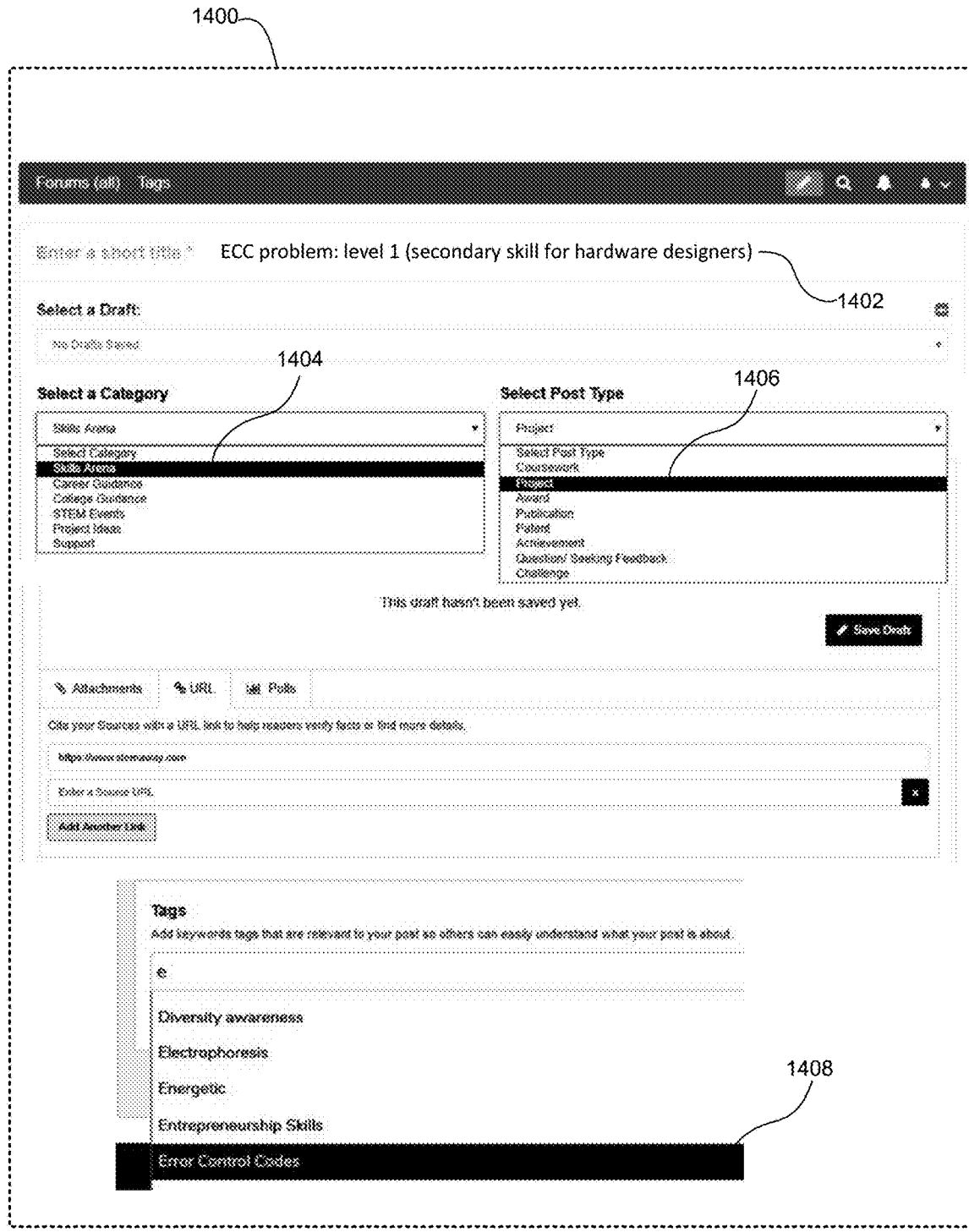
FIG. 14 depicts an exemplary embodiment of an interface for posting to a forum with skill tagging.

FIG. 14 depicts an exemplary embodiment of an interface for posting to a forum with skill tagging 1400. In the embodiment depicted in FIG. 14, a user/registrant can enter a short title 1402 of the post and the provide categorization 1404 and post type 1406, craft the post and then associate the post with tags (pre-populated based on the content of the posting or manually entered by a user and/or both).

Figure 15:
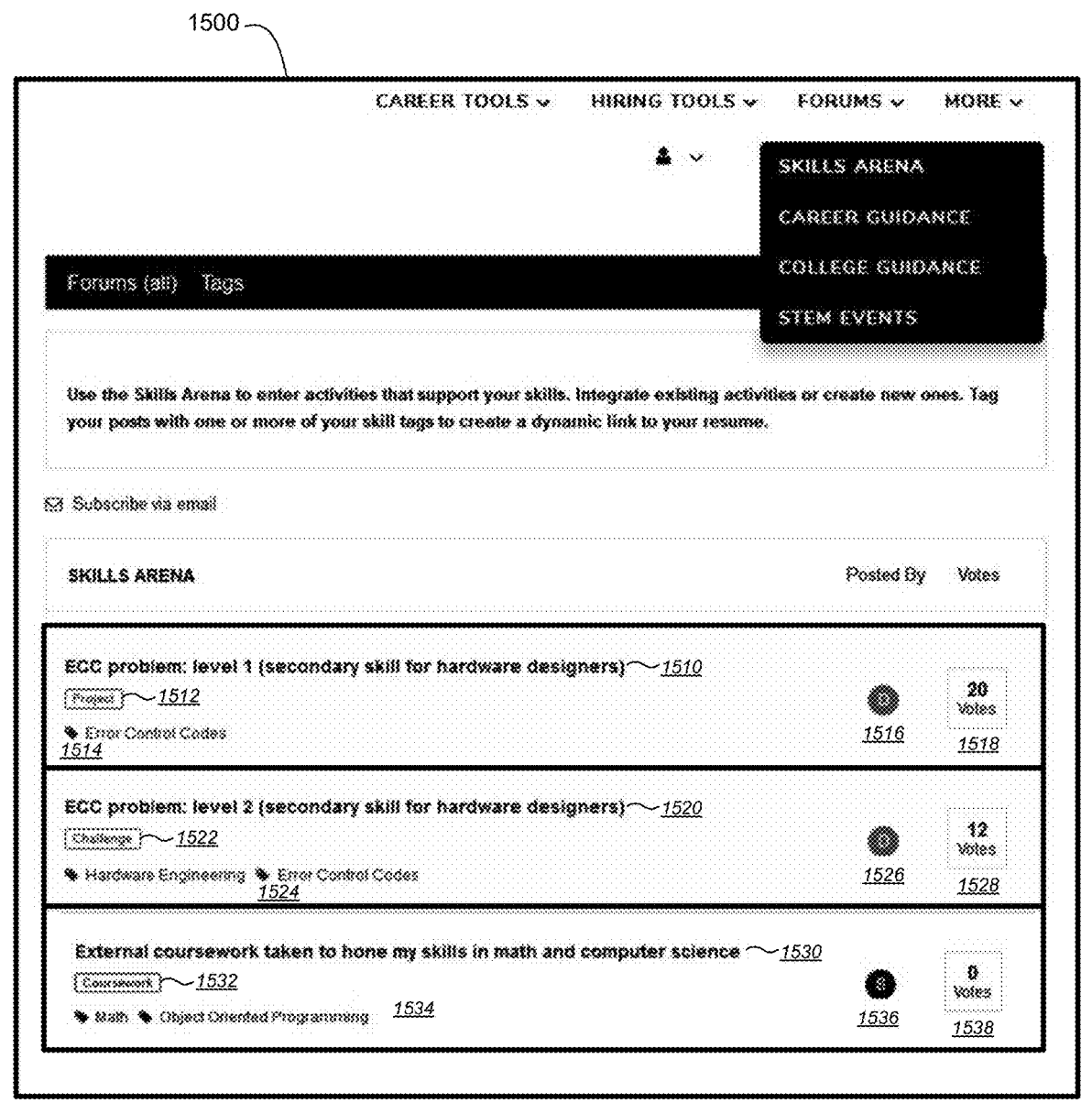

FIG. 15 depicts an exemplary embodiment of an interface for viewing a forum and/or postings 1500. In the embodiment depicted in FIG. 15, postings 1510, 1520, 1530 for particular forum and/or a particular user can be viewed. In the embodiment depicted in FIG. 15, the postings are depicted as also showing categorizations and tags 1512 1514 1522 1524 1532 1534 associated with each posting 1510 1520 1530. Additionally, each posting 1510 1520 1530 can be associated with the poster 1516 1526 1536 and the number of votes 1518 1528 1538 received for each posting. In alternate embodiments, the information can be presented in various ways and/or can be presented with a ranking/weight and/or with less or alternate information, as desired.

Figure 16:
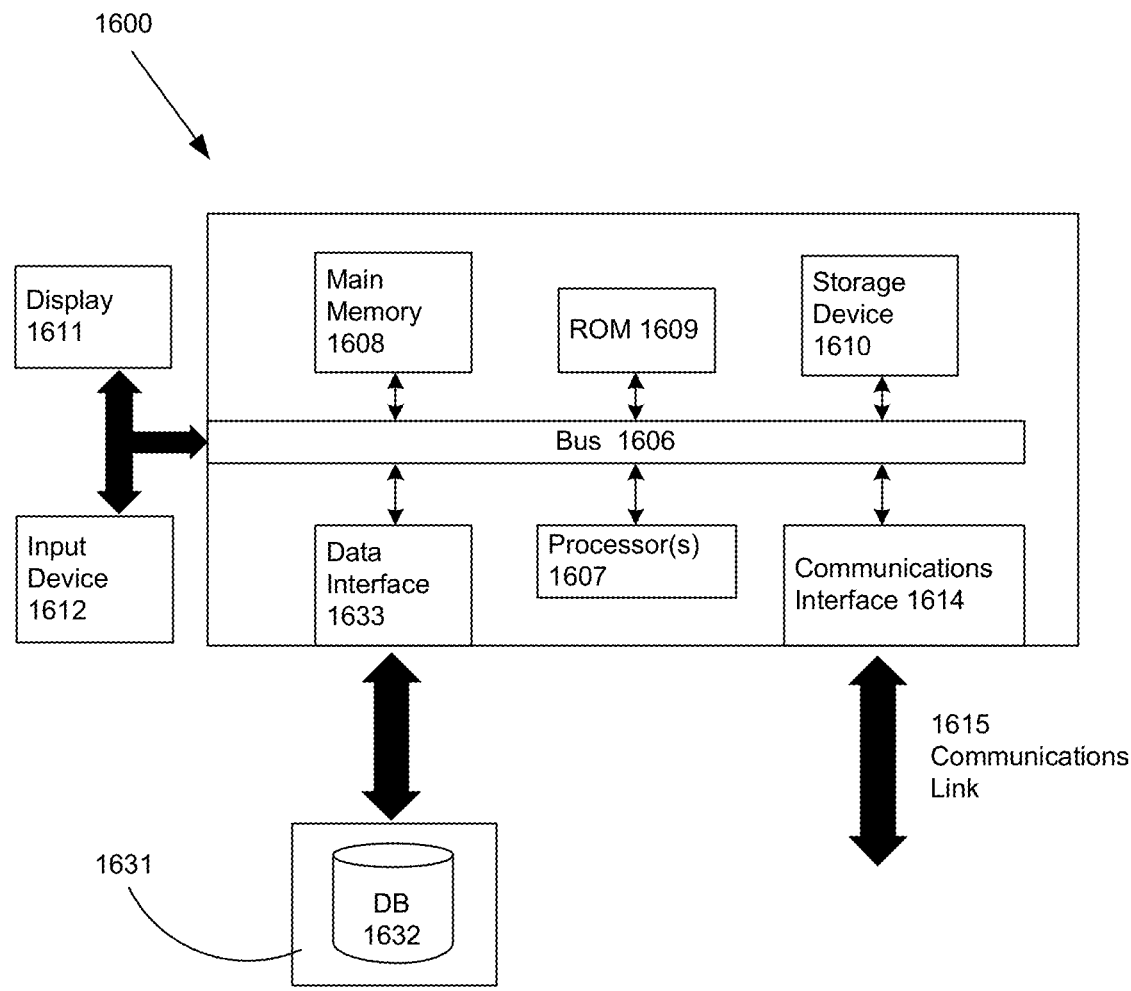
FIG. 16 depicts an exemplary embodiment of a computer system.

The execution of the sequences of instructions required to practice the embodiments can be performed by a computer system 1600 as shown in FIG. 16. In an embodiment, execution of the sequences of instructions is performed by a single computer system 1600. According to other embodiments, two or more computer systems 1600 coupled by a communication link 1615 can perform the sequence of instructions in coordination with one another. Although a description of only one computer system 1600 will be presented below, however, it should be understood that any number of computer systems 1600 can be employed to practice the embodiments.

A computer system 1600 according to an embodiment will now be described with reference to FIG. 16, which is a block diagram of the functional components of a computer system 1600. As used herein, the term computer system 1600 is broadly used to describe any computing device that can store and independently run one or more programs.

Each computer system 1600 can include a communication interface 1614 coupled to the bus 1606. The communication interface 1614 provides two-way communication between computer systems 1600. The communication interface 1614 of a respective computer system 1600 transmits and receives electrical, electromagnetic or optical signals, that include data streams representing various types of signal information, e.g., instructions, messages and data. A communication link 1615 links one computer system 1600 with another computer system 1600. For example, the communication link 1615 can be a LAN, in which case the communication interface 1614 can be a LAN card, or the communication link 1615 can be a PSTN, in which case the communication interface 1614 can be an integrated services digital network (ISDN) card or a modem, or the communication link 1615 can be the Internet, in which case the communication interface 1614 can be a dial-up, cable or wireless modem.

A computer system 1600 can transmit and receive messages, data, and instructions, including program, i.e., application, code, through its respective communication link 1615 and communication interface 1614. Received program code can be executed by the respective processor(s) 1607 as it is received, and/or stored in the storage device 1610, or other associated non-volatile media, for later execution.

In an embodiment, the computer system 1600 operates in conjunction with a data storage system 1631, e.g., a data storage system 1631 that contains a database 1632 that is readily accessible by the computer system 1600. The computer system 1600 communicates with the data storage system 1631 through a data interface 1633. A data interface 1633, which is coupled to the bus 1606, transmits and receives electrical, electromagnetic or optical signals, that include data streams representing various types of signal information, e.g., instructions, messages and data. In embodiments, the functions of the data interface 1633 can be performed by the communication interface 1614.

Computer system 1600 includes a bus 1606 or other communication mechanism for communicating instructions, messages and data, collectively, information, and one or more processors 1607 coupled with the bus 1606 for processing information. Computer system 1600 also includes a main memory 1608, such as a random access memory (RAM) or other dynamic storage device, coupled to the bus 1606 for storing dynamic data and instructions to be executed by the processor(s) 1607. The main memory 1608 also can be used for storing temporary data, i.e., variables, or other intermediate information during execution of instructions by the processor(s) 1607.

The computer system 1600 can further include a read only memory (ROM) 1609 or other static storage device coupled to the bus 1606 for storing static data and instructions for the processor(s) 1607. A storage device 1610, such as a magnetic disk or optical disk, can also be provided and coupled to the bus 1606 for storing data and instructions for the processor(s) 1607.

A computer system 1600 can be coupled via the bus 1606 to a display device 1611, such as, but not limited to, a cathode ray tube (CRT) or a liquid-crystal display (LCD) monitor, for displaying information to a user. An input device 1612, e.g., alphanumeric and other keys, is coupled to the bus 1606 for communicating information and command selections to the processor(s) 1607.

According to one embodiment, an individual computer system 1600 performs specific operations by their respective processor(s) 1607 executing one or more sequences of one or more instructions contained in the main memory 1608. Such instructions can be read into the main memory 1608 from another computer-usable medium, such as the ROM 1609 or the storage device 1610. Execution of the sequences of instructions contained in the main memory 1608 causes the processor(s) 1607 to perform the processes described herein. In alternative embodiments, hard-wired circuitry can be used in place of or in combination with software instructions. Thus, embodiments are not limited to any specific combination of hardware circuitry and/or software.

The term "computer-usable medium," as used herein, refers to any medium that provides information or is usable by the processor(s) 1607. Such a medium can take many forms, including, but not limited to, non-volatile, volatile and transmission media. Non-volatile media, i.e., media that can retain information in the absence of power, includes the ROM 1609, CD ROM, magnetic tape, and magnetic discs. Volatile media, i.e., media that can not retain information in the absence of power, includes the main memory 1608. Transmission media includes coaxial cables, copper wire and fiber optics, including the wires that comprise the bus 1606. Transmission media can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications.

In the foregoing specification, the embodiments have been described with reference to specific elements thereof. It will, however, be evident that various modifications and changes can be made thereto without departing from the broader spirit and scope of the embodiments. For example, the reader is to understand that the specific ordering and combination of process actions shown in the process flow diagrams described herein is merely illustrative, and that using different or additional process actions, or a different combination or ordering of process actions can be used to enact the embodiments. The specification and drawings are, accordingly, to be regarded in an illustrative rather than restrictive sense.

It should also be noted that the present invention can be implemented in a variety of computer systems. The various techniques described herein can be implemented in hardware or software, or a combination of both. Preferably, the techniques are implemented in computer programs executing on programmable computers that each include a processor, a storage medium readable by the processor (including volatile and non-volatile memory and/or storage elements), at least one input device, and at least one output device. Program code is applied to data entered using the input device to perform the functions described above and to generate output information. The output information is applied to one or more output devices. Each program is preferably implemented in a high level procedural or object-oriented programming language to communicate with a computer system. However, the programs can be implemented in assembly or machine language, if desired. In any case, the language can be a compiled or interpreted language. Each such computer program is preferably stored on a storage medium or device (e.g., ROM or magnetic disk) that is readable by a general or special purpose programmable computer for configuring and operating the computer when the storage medium or device is read by the computer to perform the procedures described above. The system can also be considered to be implemented as a computer-readable storage medium, configured with a computer program, where the storage medium so configured causes a computer to operate in a specific and predefined manner. Further, the storage elements of the exemplary computing applications can be relational or sequential (flat file) type computing databases that are capable of storing data in various combinations and configurations.

With regards to FIGS. 1-15, steps attributed to a computer can be accomplished by a variety of software and/or hardware elements of a computer. In some embodiments, a specific step or portion of a step can be described as performed by a specific element, such as an application. Although some specific embodiments may be as so described, the available embodiments disclosed herein are generally not so limited. For example, it can be appreciated that corresponding to a specific step, accomplishing a specific operation and/or set of operations can be attributed to specific applications, libraries, operating system functions, and/or other elements of computer 1600 in a variety of ways. Further, in some embodiments, a specific operation and/or set of operations corresponding to a specific step can be accomplished by a combination of operations of elements of computer 1600.

Although exemplary embodiments of the invention have been described in detail above, those skilled in the art will readily appreciate that many additional modifications are possible in the exemplary embodiments without materially departing from the novel teachings and advantages of the invention. Accordingly, these and all such modifications are intended to be included within the scope of this invention construed in breadth and scope in accordance with the appended claims.

What is claimed is:

1. A method comprising the steps of:

incorporating one or more modules into an online resume generating service to improve a capability of the online resume generating service to provide skill verification corresponding to a resume, the resume stored in database storage of a database of the online resume generating service, the one or more modules configuring one or more computer processors of the online resume generating service to perform operations, the operations comprising:

instantiating the resume corresponding to a first user in the database storage;

notating, in the resume, records of one or more specified skills corresponding to the first user;

storing a message in the database storage as a first post corresponding to the first user, wherein a first online forum comprises a posting of the message;

attaching a skill tag to the first post, the skill tag corresponding to the first user and a selected one of the specified skills;

monitoring the first online forum for posts corresponding to the first user;

detecting a post corresponding to the first user that comprises the skill tag corresponding to the selected one of the specified skills, and, linking the detected post with the resume, thus augmenting the resume with a link to the detected post;

receiving a query corresponding to the first user and the selected one of the specified skills; and, in response to the query, presenting the resume comprising the link to the detected post, thereby providing at least some skill verification corresponding to the resume.

2. The method of claim 1, the operations further comprising:

presenting an array of possibly relevant attributes corresponding to the first post; recording in the database storage a choice of none or more of the possibly relevant attributes, corresponding to a first voter and a user role corresponding to the first voter, thus providing and storing a first rating corresponding to the first post, the first voter, and the user role corresponding to the first voter;

determining a weighting value associated with the selected one of the specified skills, responsive to one or more of:

a count of posts that comprise a skill tag corresponding to the first user and the selected one of the specified skills, ratings corresponding to posts that comprise a skill tag corresponding to the first user and the selected one of the specified skills, user roles of voters who provide the ratings corresponding to posts that comprise a skill tag corresponding to the first user and the selected one of the specified skills, and, ratings profiles of the voters who provide ratings corresponding to posts that comprise a skill tag corresponding to the first user and the selected one of the specified skills; and, in response to the query, providing an indication of the weighting value associated with the selected one of the specified skills, thereby providing skill verification corresponding to the resume.

3. The method of claim 2, wherein:

the first post is categorized as corresponding to a specified type of one or more types, and, elements of the array of possibly relevant attributes are at least in part presented responsive to the specified type.

4. The method of claim 3, wherein an accuracy rating is associated with the first voter and the accuracy rating of the first voter is combined with the rating of the first voter associated with the one of the specified skills.

5. The method of claim 4, wherein the accuracy rating associated with the first voter is based at least in part on a comparison of votes cast by the first voter related to postings other than the first posting and votes cast by voters other than the first voter related to the posting other than the first posting.

6. The method of claim 5 wherein the accuracy rating associated with the first voter is increased based on the degree of agreement between votes cast by the first voter related to postings other than the first posting and votes cast by voters other than the first voter related to the posting other than the first posting.

7. The method of claim 6 wherein the accuracy rating associated with the first voter is decreased based on the degree of divergence between votes cast by the first voter related to postings other than the first posting and votes cast by voters other than the first voter related to the posting other than the first posting.

8. The method of claim 2, wherein the accuracy rating associated with the first voter is based at least in part on a comparison of votes cast by the first voter related to postings other than the first posting and votes cast by voters other than the first voter related to the posting other than the first posting.

9. The method of claim 8 wherein the accuracy rating associated with the first voter is increased based on the degree of agreement between votes cast by the first voter related to postings other than the first posting and votes cast by voters other than the first voter related to the posting other than the first posting.

10. The method of claim 9 wherein the accuracy rating associated with the first voter is decreased based on the degree of divergence between votes cast by the first voter related to postings other than the first posting and votes cast by voters other than the first voter related to the posting other than the first posting.

11. A system comprising one or more computer processors, memory, and a database, the system configured to perform operations comprising:

instantiating in memory a resume corresponding to a first user;

identifying a portion of said resume having at least one predefined skill contained within said resume;

instantiating posting forums in a database;

identifying a posting made by said first user in said database; associating said posting with said at least one predefined skill; and associating said posting with said portion of said resume having at least one predefined skill, such that a viewer of said resume can access said posting from said instantiated resume.

12. The system of claim 11 further comprising:

monitoring said posting forum for additional posts corresponding to said first user;

detecting said additional posts corresponding to said first user;

associating said addition posts corresponding to said first user;

identifying said one or more skills within said additional posts; and associating said additional posts corresponding to said one or more skills with those portions of said resume of said first user associated with said one or more skills.

13. The system of claim 12 further comprising:

receiving a query corresponding to one of said first user and said one or more predefined skills; and in response to said query, presenting said resume of said user.

14. The system of claim 13, wherein voters can provide a rating of said posting.

15. The system of claim 14, wherein voters can have a weighting value.

16. The system of claim 15, wherein said weighting value of said voter is determined based at least in part on a voter's degree of agreement with other voters regarding said rating of said posting.

17. The system of claim 16, wherein said weighting value of said voter is increased based upon the degree of agreement with other voters regarding said rating of said posting and other postings contained within said posting forum.

18. The system of claim 16, wherein said weighting value of said voter is decreased based on up the degree of divergence of the voter's ratings in other postings contained within said posting forum.

19. The system of claim 16, wherein said weighting value of said voter can be fixed.

* * * * *